(12) United States Patent
Edwards et al.

(10) Patent No.: US 8,123,283 B2
(45) Date of Patent: Feb. 28, 2012

(54) BED CORRUGATION FOR VEHICLE LOAD-CARRYING BED

(75) Inventors: David M. Edwards, Marysville, OH (US); Matthew R. Lux, Dublin, OH (US); James P. Ryan, Powell, OH (US); Alexander Hutter, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 12/536,946

(22) Filed: Aug. 6, 2009

(65) Prior Publication Data

US 2011/0031778 A1 Feb. 10, 2011

(51) Int. Cl.
*B62D 33/02* (2006.01)
(52) U.S. Cl. .................................. 296/183.1
(58) Field of Classification Search ............... 296/183.1, 296/39.1, 39.2
See application file for complete search history.

(56) References Cited

U.S. PATENT DOCUMENTS

| | | | |
|---|---|---|---|
| 3,188,131 A | 6/1965 | Attwood | |
| 4,047,749 A | 9/1977 | Lambitz et al. | |
| 4,188,058 A | 2/1980 | Resa et al. | |
| 4,241,146 A * | 12/1980 | Sivachenko et al. | 428/600 |
| RE32,198 E | 7/1986 | Wayne | |
| 4,726,159 A * | 2/1988 | Stohs | 52/99 |
| 4,752,097 A | 6/1988 | Van Kirk et al. | |
| 4,862,666 A * | 9/1989 | Kero | 52/630 |
| 4,984,673 A * | 1/1991 | Saito et al. | 198/333 |
| 4,990,049 A | 2/1991 | Hargrove | |
| 5,165,747 A | 11/1992 | Stringer et al. | |
| 5,440,998 A | 8/1995 | Morgan, IV et al. | |
| 5,648,031 A | 7/1997 | Sturtevant et al. | |
| 6,022,062 A | 2/2000 | Fleenor | |
| 6,048,017 A | 4/2000 | Doshi | |
| 6,128,815 A | 10/2000 | Jurica et al. | |
| 6,237,980 B1 | 5/2001 | Miles et al. | |
| 6,340,513 B1 | 1/2002 | Hammond et al. | |
| 6,347,454 B1 * | 2/2002 | Jurica et al. | 29/897.2 |
| 6,431,629 B1 | 8/2002 | Emery | |
| 6,509,084 B2 * | 1/2003 | Sturtevant et al. | 428/141 |
| 6,530,730 B2 | 3/2003 | Swensen | |
| 6,794,013 B1 | 9/2004 | Iacovelli et al. | |
| 6,799,792 B2 | 10/2004 | Jurica et al. | |
| 6,880,875 B2 | 4/2005 | McClure et al. | |
| 7,086,680 B2 * | 8/2006 | Montagna et al. | 296/39.2 |
| D546,267 S | 7/2007 | Burchett et al. | |
| 7,290,827 B2 | 11/2007 | McNulty et al. | |
| 2008/0099520 A1 | 5/2008 | Mitchell, Jr. | |
| 2008/0150322 A1 | 6/2008 | Shelbo et al. | |

FOREIGN PATENT DOCUMENTS

JP 2004-168252 6/2004

* cited by examiner

*Primary Examiner* — H Gutman
(74) *Attorney, Agent, or Firm* — Rankin Hill & Clark LLP

(57) ABSTRACT

A cargo protecting system for a vehicle having a load-carrying bed comprises a support structure and a bed floor fixedly supported by the support structure. The support structure forms at least a portion of a frame of a vehicle. The bed floor includes a support surface having a plurality of longitudinal extending, spaced apart raised ridges for directly supporting cargo. Each ridge has elevated and angled parts and an upper part. The upper part of each ridge has an increased thickness compared to the other parts and a raised section for increased strength and rigidity of the ridge. Each ridge includes a wear resistant surface having a first texture disposed substantially over the entire ridge and a second texture disposed over the upper part of the ridge. The second texture is disposed at least partially over the first texture.

20 Claims, 11 Drawing Sheets

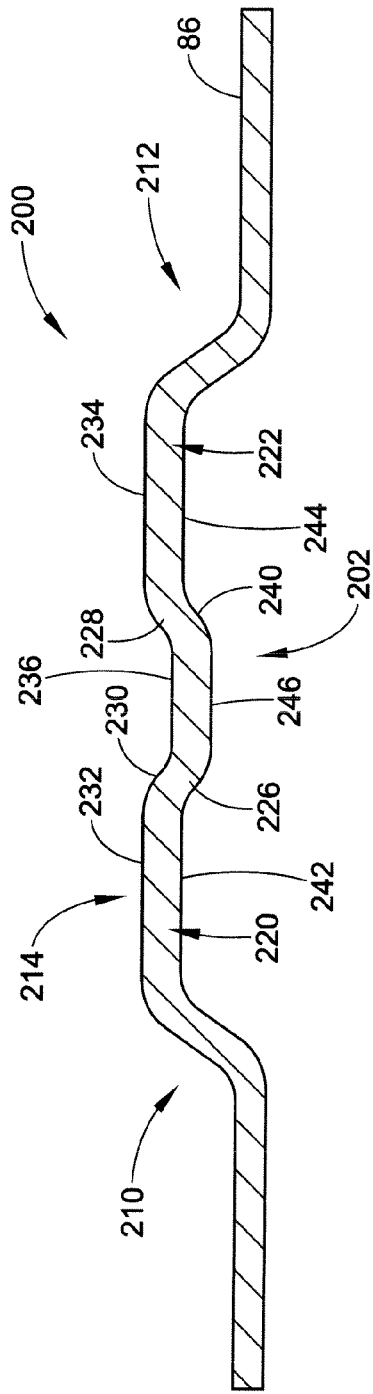
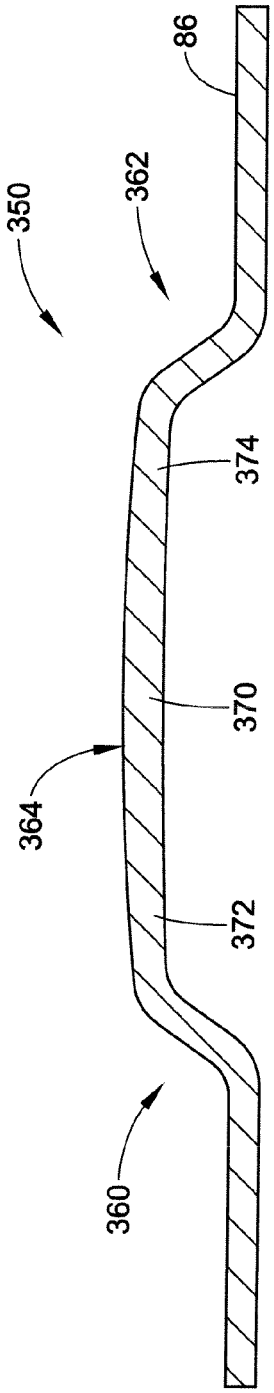

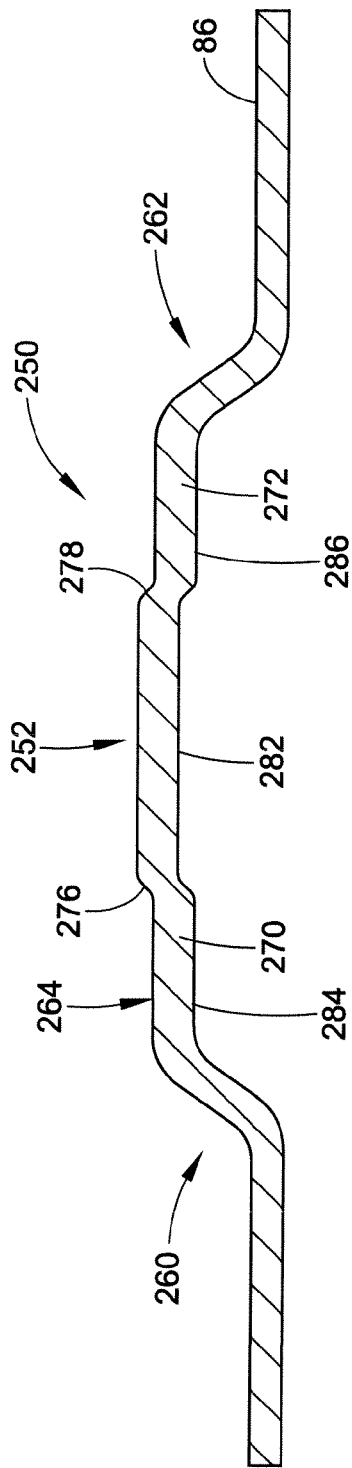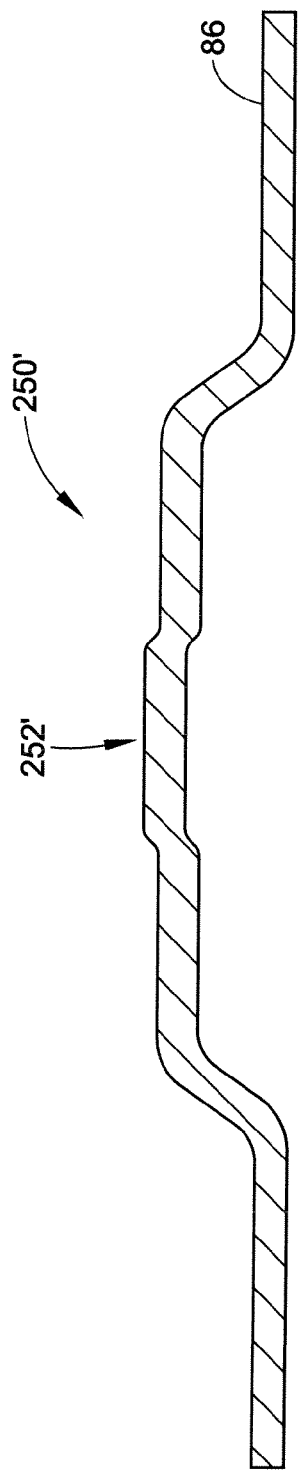

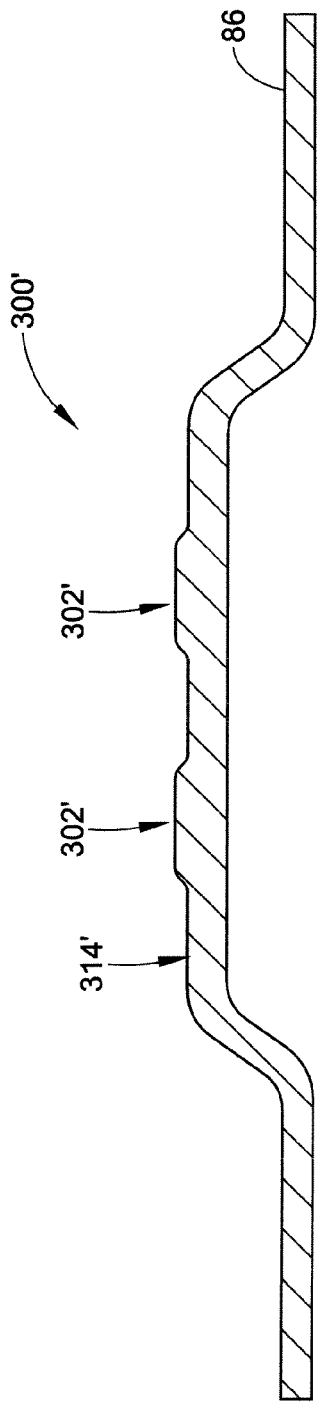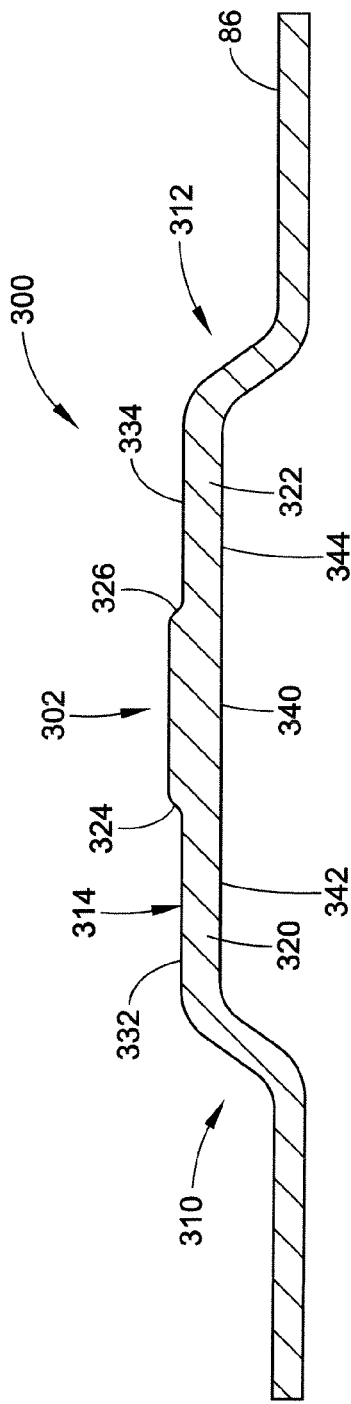

BED CORRUGATION FOR VEHICLE LOAD-CARRYING BED

BACKGROUND

Exemplary embodiments herein generally relate to a load-carrying bed system and construction for a vehicle, and more particularly relate to bed corrugations provided in a vehicle's load carrying bed.

Vehicles having load-carrying beds (e.g., pickup trucks) are commonly used to facilitate transportation of cargo items from one location to another, such as through placement of cargo items in the bed. While such vehicles are available in many sizes and configurations, a typical load-carrying bed vehicle includes a bed floor that can support cargo, such as lumber, rocks, groceries and/or other items. A typical load-carrying bed also includes a headboard structure and side walls to help restrain cargo within the bed. Sometimes a tailgate or other closure is provided along an open end of the bed (i.e., the end opposite the headboard).

To reduce damage to the load-carrying bed (e.g., scratching, dents, etc.) and to the cargo carried therein, bed liners are sometimes used in association with load-carrying vehicle beds. A typical bed liner is formed of plastic or some type of resinous material and overlays the load-carrying bed. In one configuration, the liner is formed of essentially two pieces: a first piece overlaying the bed floor and wrapping over the headboard and the sidewalls, and a second piece covering an inside surface of the tailgate. More recently, the vehicle bed itself is formed at least in part from plastic or some other type of resinous material obviating the need for a separate bed liner.

To facilitate the carrying of cargo in load-carrying beds, it is known to employ corrugations in the bed floor or in the portion of a bed liner that overlies the bed floor. Corrugations advantageously increase the strength and rigidity of the supporting surface on which cargo items are received. As shown in FIGS. 1 and 2, a common corrugation arrangement used in vehicle load-carrying beds 10 is the provision of a plurality of longitudinally extending ridges 12 on a bed floor 14 that are spaced apart and parallel relative to one another. Each ridge 12 typically includes a raised support wall or top wall 16 which, at opposite side edges thereof, is elevated by a pair of spaced apart support walls or sidewalls 18 and 20. The sidewalls 18, 20 can flare or taper outwardly and downwardly for joinder to the bed floor 14. The top wall 16 has an upper surface 22 and a lower surface 24 which together define the top wall as having a constant thickness (i.e., the surfaces 22, 24 are parallel and spaced apart from one another). As shown, both the upper and lower surfaces 22, 24 of the top wall 16 of each conventional ridge 12 are substantially flat.

Another function of the ridges is to raise carried cargo items slightly up and off the bed floor. This prevents the cargo items from resting in any residual amounts of water (e.g., rainwater) or other debris remaining in the load-carrying bed. In effect, the raised support walls of the ridges, which are disposed in a common plane, together form a supporting surface for the carried cargo items. Absent tie-downs or other load restraining devices, the ridges do little to limit movement and shifting of the carried cargo items within the load-carrying bed. Moreover, the ridges are prone to wear and showing such wear as they often receive the most contact by cargo carried in the bed whether the cargo is one or more contained cargo items (e.g., boxed items) or loose material (e.g., rocks, mulch, etc.).

BRIEF DESCRIPTION

In accordance with one aspect, a cargo protecting system for a vehicle having a load-carrying bed comprises a vehicle frame support structure and a bed floor fixedly supported by the support structure. The bed floor includes a support surface having a plurality of longitudinal extending, spaced apart raised ridges for directly supporting cargo. Each ridge has a pair of side walls and a top wall. The top wall of each ridge has a generally corrugated profile. The bed floor has a thickness. The side walls of each ridge have a thickness greater than the bed floor thickness. The top wall has a thickness greater than the thickness of each side wall. The increasing thickness provides for increased strength and rigidity of the ridge.

In accordance with another aspect, a cargo protecting system for a vehicle having a load-carrying bed comprises a support structure and a bed floor fixedly supported by the support structure. The support structure forms at least a portion of a frame of a vehicle. The bed floor includes a support surface having a plurality of longitudinal extending, spaced apart raised ridges for directly supporting cargo. Each ridge has elevated and angled parts and an upper part. The upper part of each ridge has an increased thickness compared to the other parts and a raised section for increased strength and rigidity of the ridge. Each ridge includes a wear resistant surface having a first texture disposed substantially over the entire ridge and a second texture disposed over the upper part of the ridge. The second texture is disposed at least partially over the first texture.

In accordance with yet another aspect, a load-carrying bed for attachment to a frame of a vehicle comprises a bed floor fixedly supported by a vehicle frame. The bed floor includes a support surface having a plurality of longitudinal extending, spaced apart ridges for directly supporting cargo. Each ridge includes a pair of side walls and a top wall. Each ridge includes a wear resistant surface having a first texture disposed substantially over the entire ridge and a second texture disposed over the top wall of the ridge.

BRIEF DESCRIPTION OF THE DRAWINGS

FIG. 6 is an exemplary cross-sectional view of a corrugation profile having a depressed section for at least one ridge of the load-carrying bed of the pickup truck of FIG. 3.

FIGS. 7 and 8 are exemplary cross-sectional views of corrugation profiles having a raised section according to one aspect for at least one ridge of the load-carrying bed of the pickup truck of FIG. 3.

FIGS. 9 and 10 are exemplary cross-sectional views of corrugation profiles having a raised section according to another aspect for at least one ridge of the load-carrying bed of the pickup truck of FIG. 3.

FIG. 11 is an exemplary cross-sectional view of a corrugation profile having a generally arcuate shape for at least one ridge of the load-carrying bed of the pickup truck of FIG. 3.

DETAILED DESCRIPTION

Figure 1:
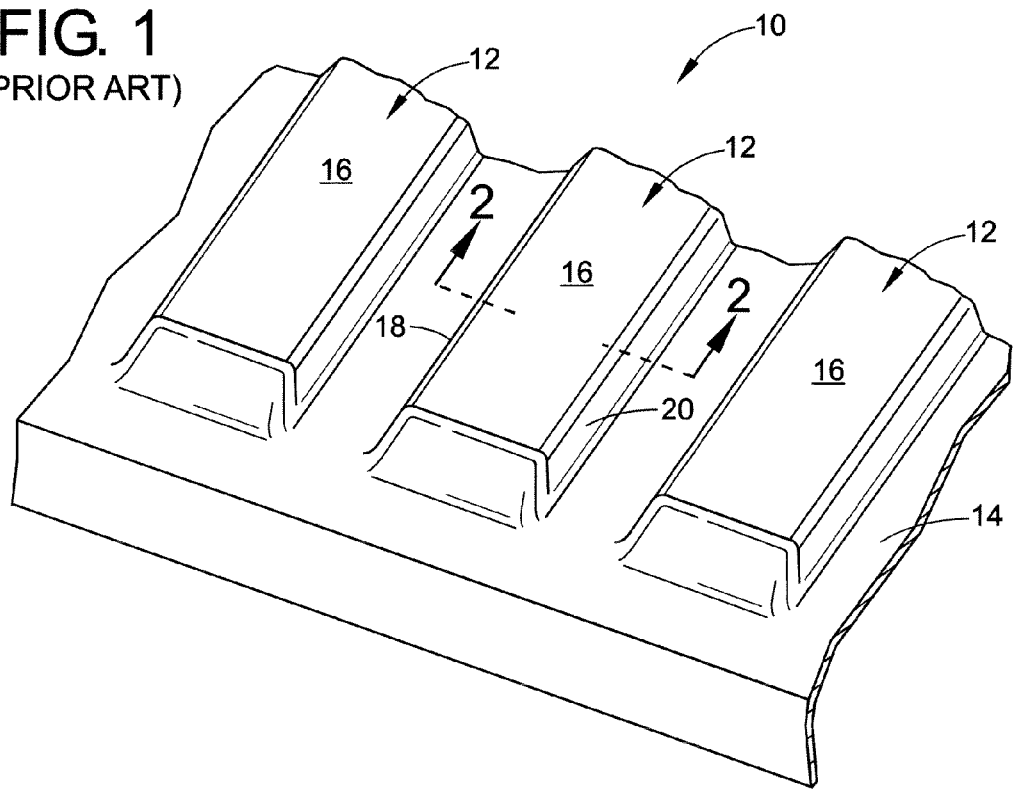
FIG. 1 is a partial perspective view of conventional raised ribs or ridges disposed along a bed floor of a load-carrying bed.
Figure 2:
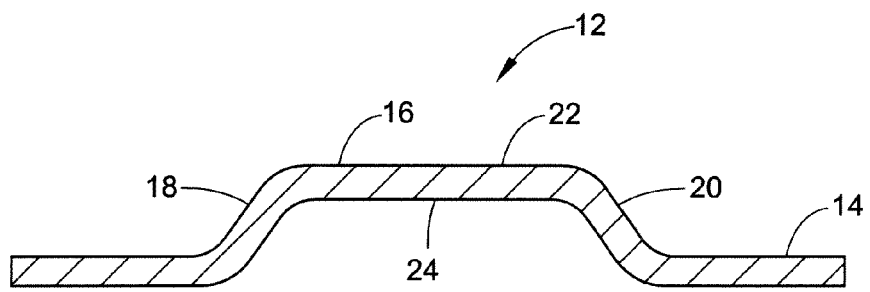
FIG. 2 is a cross-sectional view of one of the conventional ridges of FIG. 1 taken generally along lines 2-2 of FIG. 1.

It should, of course, be understood that the description and drawings herein are merely illustrative and that various modifications and changes can be made in the structures disclosed without departing from the present disclosure. It will also be appreciated that the various identified components of the vehicle bed system disclosed herein are merely terms of art that may vary from one manufacturer to another and should not be deemed to limit the present disclosure. All references to direction and position, unless otherwise indicated, refer to the orientation of the vehicle bed system illustrated in the drawings and should not be construed as limiting the claims appended hereto.

Figure 3:
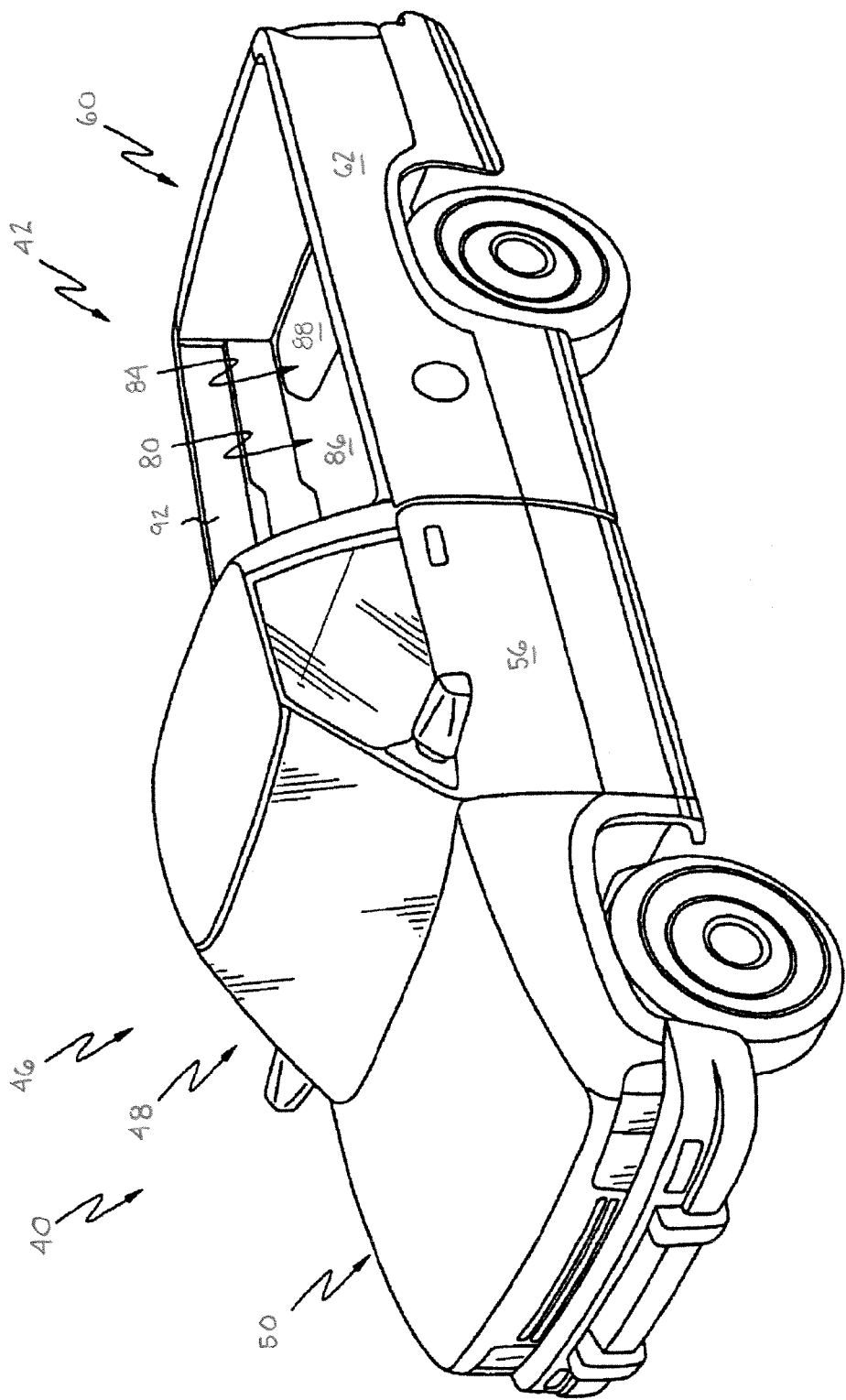
FIG. 3 is a front perspective view of an exemplary vehicle having a load-carrying bed.
Figure 4:
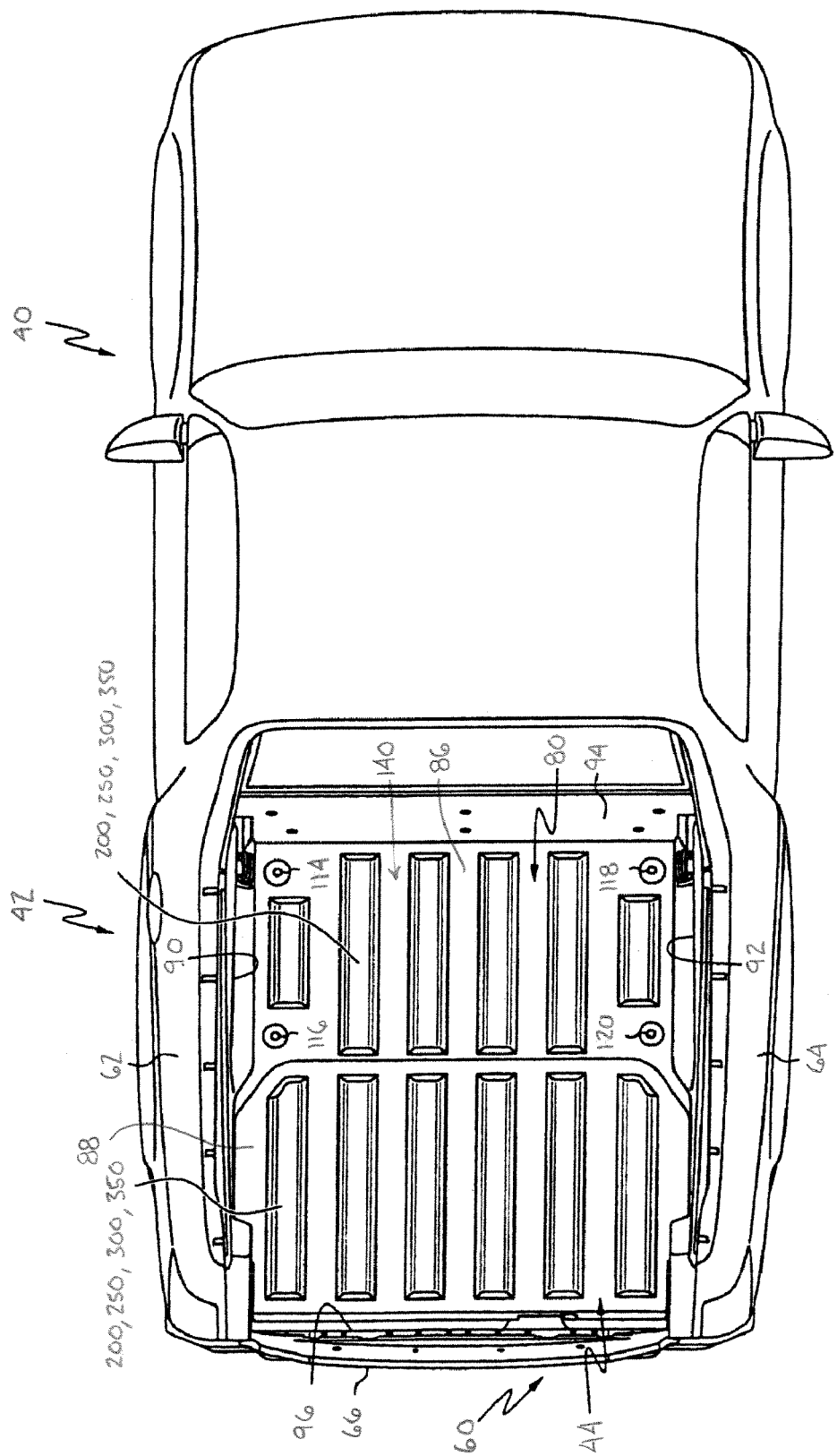
FIG. 4 is a top plan view generally depicting the vehicle of FIG. 3.

Referring now to the drawings, wherein like numerals refer to like parts throughout the several views, FIGS. 3 and 4 illustrate an exemplary vehicle or truck 40 including a load-carrying bed or bed system 42. The bed 42 is configured to hold cargo. The illustrated vehicle 40 is in the form of a pick-up truck including a cab portion 46 having a passenger compartment 48 and an engine compartment 50, both disposed forward of the bed 42. Although the passenger compartment 48 is depicted as being a pickup truck style cab having only two passenger doors (e.g., 56), it is to be understood that it could be virtually any type of cab, including for example, an extended cab and a crew cab (e.g., with four passenger doors), and to be further understood that the vehicle 40 could be any type of vehicle having a load-carrying bed. Additionally, although the bed 42 is shown in FIG. 3 to include vertically-rising walls (e.g., the headboard, side walls, and tailgate, to be later discussed) along three sides of the bed's cargo carrying floor, it should be understood that the bed might have a substantially flat cargo carrying floor that is unbounded by the headboard, side walls and/or a tailgate, such as would be typical of a flat-bed type truck.

In the illustration of FIG. 3, the bed 42 includes a tailgate 60 for restraining cargo within the bed 42 during movement of the vehicle 40. However, the bed 42 might alternatively include a net or cage in lieu of the tailgate (or some other type of restraint device), or perhaps might not include any such rear cargo restraint whatsoever. As more clearly shown in FIG. 4, the illustrated bed 42 is shown to generally include a plurality of outer body components, including a left outer body panel 62, a right outer body panel 64, and outer portion or skin 66 of tailgate 60. Such outer body components 62, 64, 66 can be formed from any of a variety of materials such as steel, aluminum, plastic, fiberglass, composites, and/or a combination thereof. In one exemplary embodiment, one or more outer body components comprise painted steel sheets. In yet a further embodiment, at least one of the outer body components is formed from plastic.

The bed 42 can further include one or more inner bed components that substantially define the primary cargo carrying compartment of the bed. Such inner bed components can include, for example, a bed floor 80 and a closure member 84 (e.g., such as a cargo lid) for selectively covering at least one chamber disposed below the bed floor 80. The bed floor 80 can include a first support surface 86 and can be considered as including the closure member 84. The closure member 84 can include a second support surface 88. The first support surface 86 can be substantially coplanar with the second support surface 88. In the exemplary embodiment, for example, the first support surface 86 and the second support surface 88 can substantially provide the cargo carrying floor of the bed 42, and can accordingly directly support cargo. Although FIG. 4 depicts the cargo carrying floor of the bed 42 as being substantially defined by a single bed floor 80 and a single closure member 84, it is of course to be understood that an exemplary truck bed might have a cargo carrying floor defined by one or more bed floors in conjunction with one or more closure members. If a truck bed includes a plurality of bed floors, each of the bed floors can be oriented substantially coplanarly to define the cargo carrying floor of the truck bed. Adjacent bed floors can be joined directly together with adhesives or fasteners, or might alternatively be indirectly connected through an underlying vehicle support structure for frame, for example.

The inner bed components can further include a left side member 90, a right side member 92, a headboard member 94, and/or an inner portion 96 of the tailgate 60. The side members 90, 92, and the headboard member 94 can extend upwardly from a location adjacent to at least a portion of the bed floor. The members 90, 92, 94 and the tailgate portion 96 can assist in restraining cargo within the truck bed portion 42. The inner bed components can be formed from any number of materials, as for example, steel, aluminum, plastic, fiberglass, composites, and/or a combination thereof.

As will be discussed in greater detail below, the inner bed components can be supported by an underlying vehicle frame support structure. The support structure can be in a fixed position relative to the vehicle 40, and in some embodiments can be secured to a frame or unibody of the vehicle 40 such as with welds, bolts, or other fastening devices, means, etc. In another embodiment, the support structure might be integral with the pickup truck's frame or unibody. In one embodiment, the support structure can comprise steel, aluminum, one or more other metals, and/or a combination thereof; alternatively, the support structure could be formed of an alternate material or combination of material.

Figure 5:
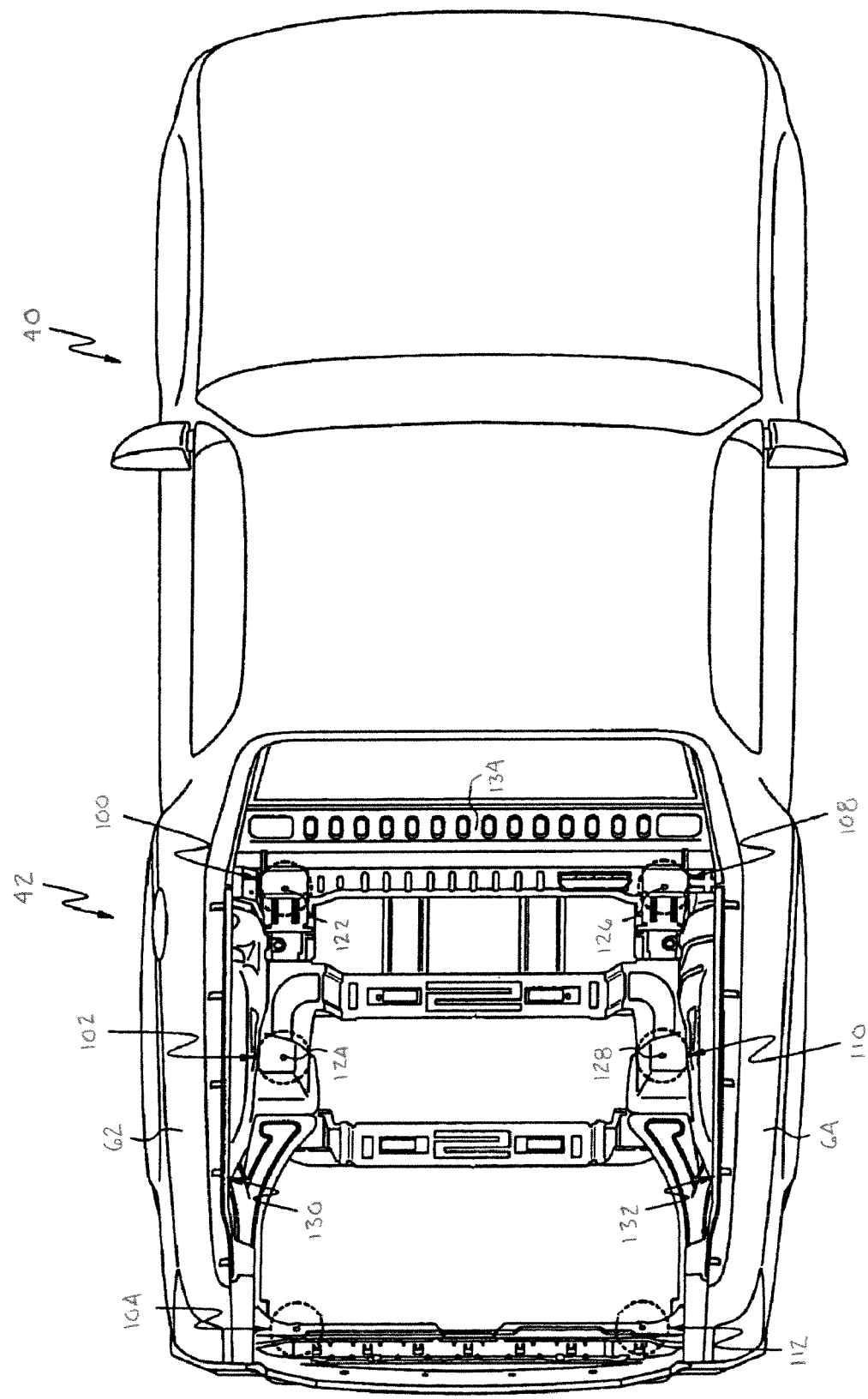
FIG. 5 is a top plan view depicting the vehicle of FIG. 4 with certain components removed to expose an exemplary underlying vehicle frame support structure.

The support structure can include one or more support members. A support member provides support and/or a fastening location for at least a portion of one or more of the inner bed components (e.g., members 90, 92, 94). For example, an exemplary support structure is shown in FIG. 5 to integrally comprise a plurality of support members 100, 102, 104, 108, 110 and 112 that are configured to provide subjacent support to the bed floor 80 and the closure member 84. With reference to FIGS. 4 and 5, the bed floor 80 can be fixedly supported by the support structure, for example, by aligning apertures 114, 116, 118 and 120 in the bed floor 80 with apertures 122, 124, 126 and 128 in the respective support members 100, 102, 108 and 110, and then by inserting bolts or other fasteners through these aligned apertures. The support structure of FIG. 5 is also shown to include a left support structure 130 (e.g., for providing support for the left outer body panel 62 and/or the left side member 90), a right support structure 132 (e.g., for providing support for the right outer body panel 64 and/or the right side member 92), and a headboard support structure 134

(e.g., for providing support for the headboard member 94). Of course, it should be understood that the specific configuration of the support structure will vary depending upon the specific type and configuration of the inner bed components (e.g., the shape of the bed floor 80).

With reference again to FIG. 4, and additional reference to FIGS. 6-11, the first support surface 86 of the bed floor 80 and the second support surface 88 of the closure member 84 each include a plurality of longitudinal extending, spaced apart raised contours or ridges 200, 250, 300, 350 for directly supporting cargo. The ridges can provide rigidity and/or texture to the cargo carrying floor. A recess 140 is defined by adjacent ridges. The recesses 140 facilitate the drainage of water and other wet debris from the bed portion 42.

With reference to FIGS. 6-11, profiles of the exemplary ridges 200, 250, 300 and 350 of the bed floor 80 are schematically illustrated. Specifically, a top wall of each exemplary ridge 200, 250, 300 and 350 can have a generally corrugated profile to increase the strength and rigidity of the bed floor 80. Each exemplary ridge 200, 250, 300 and 350 has a thickness greater than a thickness of the bed floor 80. Particularly, and as will be described in greater detail below, side walls of each ridge 200, 250, 300 and 350 have a thickness greater than a thickness of the bed floor 80, and a top wall of each ridge 200, 250, 300 and 350 has a thickness greater than the thickness of each side wall for increased strength and rigidity of the ridge.

More specifically, as shown in FIG. 6, the ridge 200 includes a longitudinally extending, depressed section 202. Particularly, the ridge 200 includes elevated and angled sidewalls 210 and 212 and a top wall 214. Opposite ends of the sidewalls 210, 212 can be provided with a first rounded curvature or radius where they join to the top wall 214 and the first support surface 86 of the bed floor 80. The top wall includes a first section 220 and a second section 222 which is spaced from the first section by the depressed section 202. End portions 226 and 228 of the depressed section 202 taper outwardly and upwardly and connect to the respective first and second sections 220 and 222. An upper surface 230 of the end portions 226, 228 can be provided with a second rounded curvature or radius where they join to upper surfaces 232 and 234 of the first and second sections 220 and 222, respectively, and an upper surface 236 of the depressed section 202. A bottom surface 240 of the end portions 226, 228 can be provided with a third rounded curvature or radius where they join to bottom surfaces 242 and 244 of the first and second sections 220 and 222, respectively. The bottom surface 240 of the end portions 226, 228 are provided with the first rounded curvature or radius where they join to a bottom surface 246 of the depressed section 202. In this exemplary embodiment, the bed floor 80 has a thickness of about 3 mm, the elevated and angled sidewall 210, 212 have a thickness of about 3.5 mm, and the top wall 212 including the depressed section 202 has a thickness of about 4 mm.

As shown in FIG. 7, the ridge 250 includes a longitudinally extending raised section or rib 252. Particularly, the ridge 250 includes elevated and angled sidewalls 260 and 262 and a top wall 264. Opposite ends of the sidewalls 260, 262 can be provided with a first rounded curvature or radius where they join to the top wall 264 and the first support surface 86 of the bed floor 80. The top wall 264 includes a first section 270 and a second section 272 which is spaced from the first section by the rib 252. End portions 276 and 278 of the rib taper outwardly and downwardly and connect to the respective first and second sections 270 and 272. The end portions 276, 278 can be provided with a second rounded curvature or radius where they join to the first and second sections 260, 262 and the rib 252. In the depicted embodiment, the rib 252 has a thickness approximately equal to a thickness of the first and second sections 270 and 272. A bottom surface 282 of the rib 252 of the ridge 250 is offset from and generally parallel to a respective bottom surface 284 and 286 of the first and second sections 270 and 272. In this exemplary embodiment, the bed floor 80 has a thickness of about 3 mm, the elevated and angled sidewall 260, 262 have a thickness of about 3.5 mm, and the top wall 264 including the raised section 252 has a thickness of about 4 mm. With reference to FIG. 8, an alternative exemplary embodiment is shown with a ridge. The difference between ridge 250 and ridge 250' is the width of the rib 252', which is has a smaller width than rib 252.

As shown in FIG. 9, the ridge 300 also includes a longitudinally extending raised section or rib 302. Particularly, the ridge 300 includes elevated and angled sidewalls 310 and 312 and a top wall 314. Opposite ends of the sidewalls 310, 312 can be provided with a first rounded curvature or radius where they join to the top wall 314 and the first support surface 86 of the bed floor 80. The top wall 314 includes a first section 320 and a second section 322 which is spaced from the first section by the rib 302. An upper surface of respective end portions 324 and 326 of the rib taper outwardly and downwardly and connect to respective upper surface 332 and 334 of the first and second sections 320 and 322. The upper surfaces 332, 334 of the rib can be provided with a second rounded curvature or radius where they join to upper surfaces 332, 334. In the depicted embodiment, the rib 302 has a thickness greater than a thickness of the first and second sections 320 and 322 of the top wall 314. For example, the first and second sections of the top wall 314 can have a thickness of about 4 mm and the rib can have a thickness of about 5 mm. Similar to the previous embodiments, the bed floor 80 has a thickness of about 3 mm and the elevated and angled sidewall 310, 312 have a thickness of about 3.5 mm. A bottom surface 340 of the rib 302 and respective bottom surfaces 342 and 344 of the first and second sections 320 and 322 together define a common bottom surface of the ridge 300. With reference to FIG. 10, an alternative exemplary embodiment is shown including ridge 300'. The difference between ridge 300 and ridge 300' is that the top wall 314' of ridge 300' includes a pair of spaced apart, longitudinally extending ribs 302'. Each rib 302' has a width smaller than a width of rib 302.

As shown in FIG. 11, the ridge 350 has a generally arcuate shape, a central section of the ridge having an increased thickness. Particularly, the ridge 350 includes elevated and angled sidewalls 360 and 362 and a top wall 364. Opposite ends of the sidewalls 360, 362 can be provided with a first rounded curvature or radius where they join to the top wall 364 and the first support surface 86 of the bed floor 80. The top wall 364 of the ridge has a central section 370 having a thickness greater than a thickness of each end section 372 and 374 of the top wall. As shown, the top wall 364 has an increasing thickness. For example, each end section 372 and 374 of the top wall 364 can have a thickness of about 4 mm and the central section 370 can have a thickness of about 5.5 mm. Similar to the previous embodiments, the bed floor 80 has a thickness of about 3 mm and the elevated and angled sidewall 360, 362 have a thickness of about 3.5 mm.

As shown, the width of the respective top wall 214, 264, 314 and 364 of each ridge 200, 250, 300 and 350 can be greater than the width of the recess 140. The width of the top wall permits the overall planar support area of the bed portion 42, as defined by the total area of the top walls of the ridges, to be of a large magnitude to thus facilitate utilization of the bed portion since the top walls 214, 264, 314 and 364 effectively define the load engaging plane of the bed portion 42. The generally corrugated profile of the improved ridges 200, 250, 300 and 350 increases the strength and rigidity of the bed floor 80. The generally corrugated profile of ridges 200, 250, 300 also defines a first support surface and a second support surface which is spaced from the first support surface. This provides the ability to lock cargo items between respective raised sections 252 and 302 of ridges 250 and 300 and depressed section 202 of ridge 200.

Figure 12:
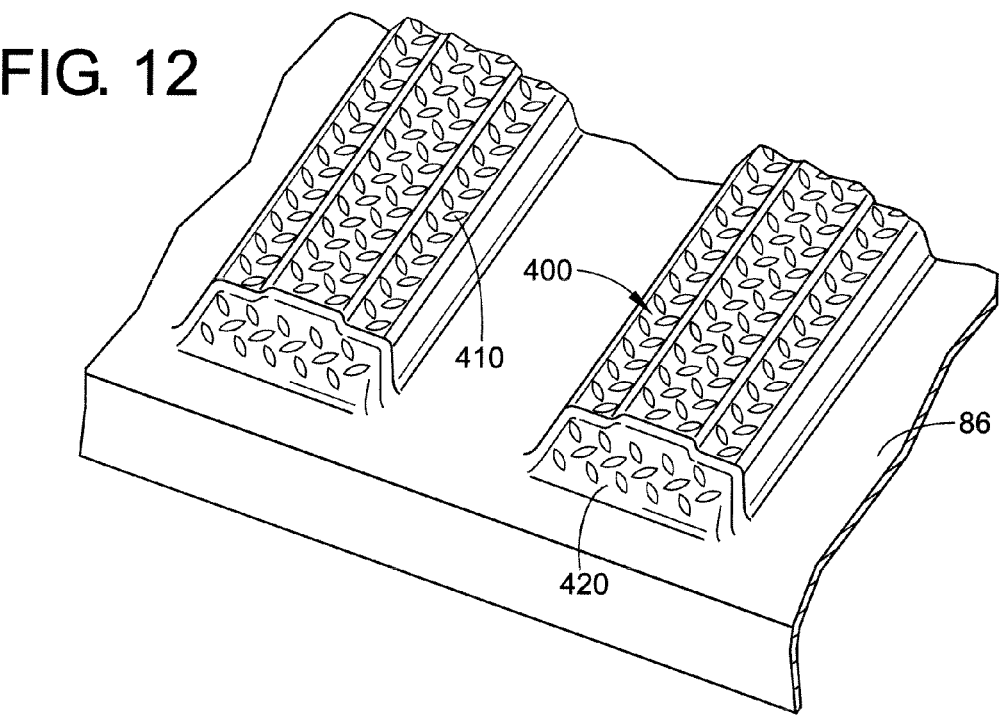
FIG. 12 is a partial perspective view of the ridge of FIG. 7 having an exemplary wear resistant surface.
Figure 13:
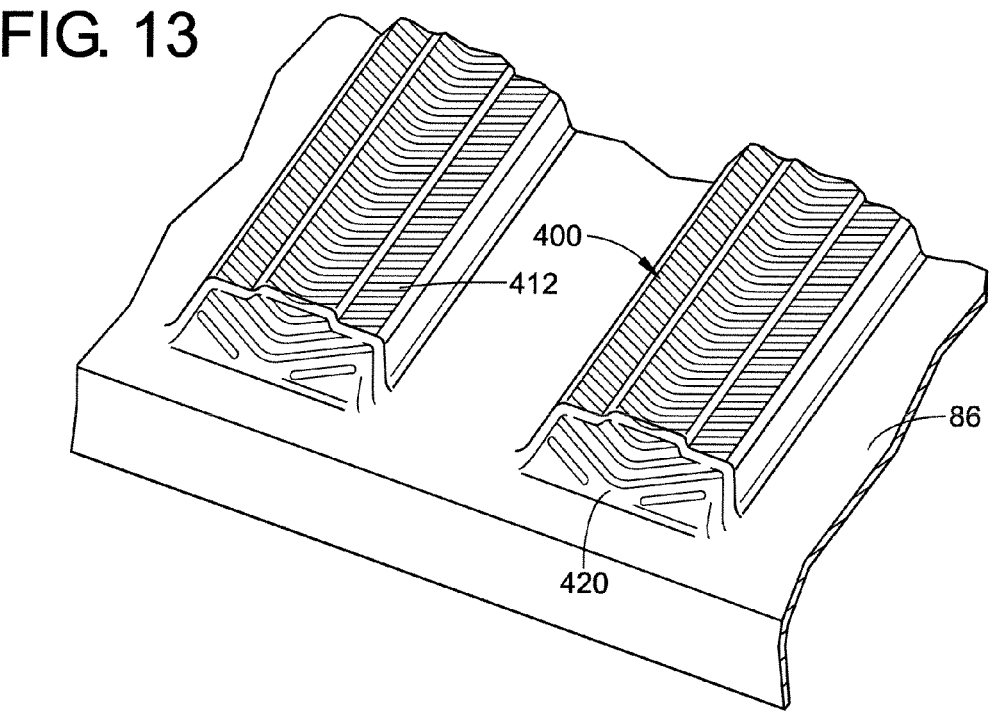
FIG. 13 is a partial perspective view of the ridge of FIG. 7 having another exemplary wear resistant surface.

With reference now to FIGS. 12 and 13, at least one ridge of the plurality of ridges 200, 250, 300 and 350 can includes an exemplary wear resistant surface 400. The wear resistant surface includes a texture disposed substantially over the entire ridge. As shown, the wear resistant surface can includes one of a plurality of generally diamond shaped projections 410 and a plurality of generally V-shaped projections 412, though other patterns are possible. The diamond shaped projections and V-shaped projections are located on the top wall and an end wall 420 of the ridge. Because the bed floor 80 is a potentially high-damage area due to heavy customer usage, the wear resistant surface 400 can at least partially prevent wear and damage (such as scratches) to the ridge. For example, surface 400 can absorb wear and scratches while generally preserving the ridges.

Figure 14:
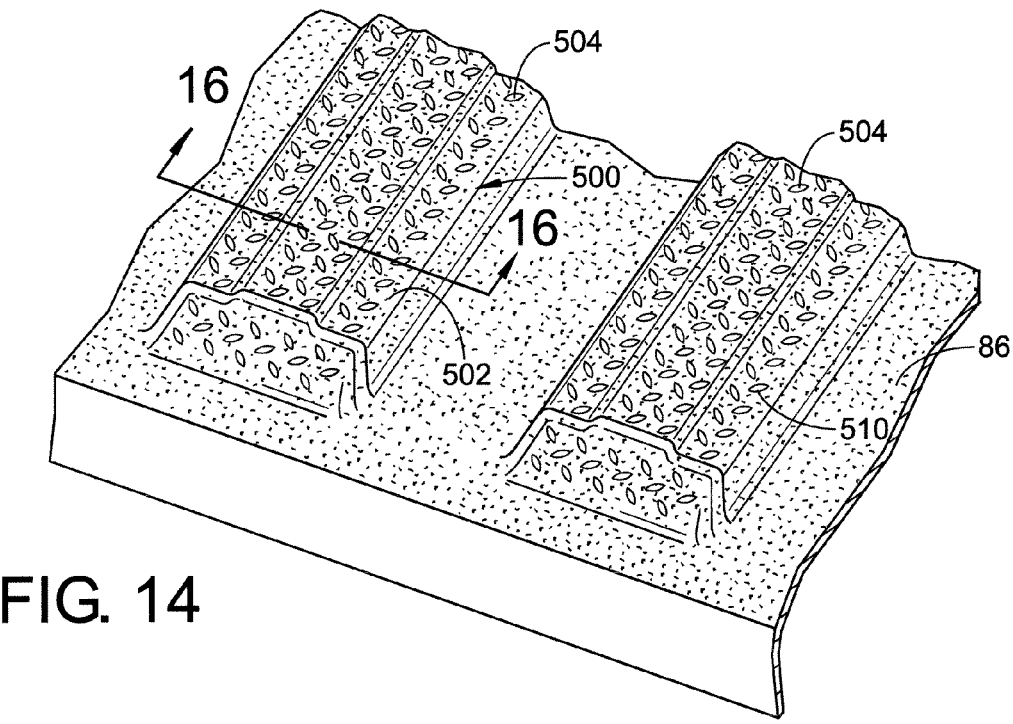
FIG. 14 is a partial perspective view of the ridge of FIG. 7 having yet another exemplary wear resistant surface, the wear resistant surface having a first texture and a second texture.
Figure 15:
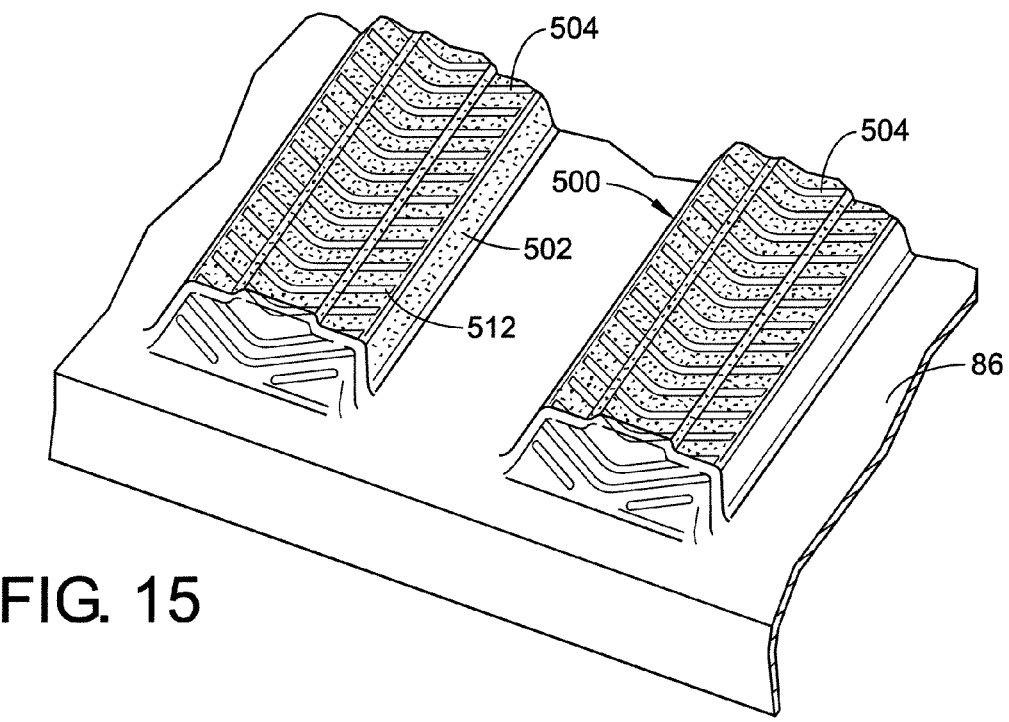
FIG. 15 is a partial perspective view of the ridge of FIG. 7 having yet another exemplary wear resistant surface, the wear resistant surface having a first texture and a second texture.
Figure 16:
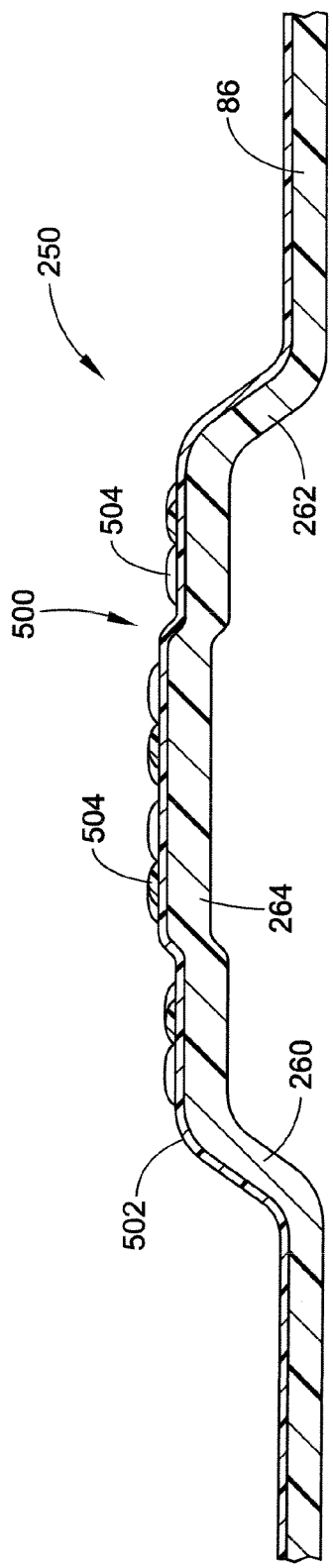
FIG. 16 is a cross-section view of the ridge of FIG. 14 taken generally along lines 16-16 of FIG. 14.
Figure 17:
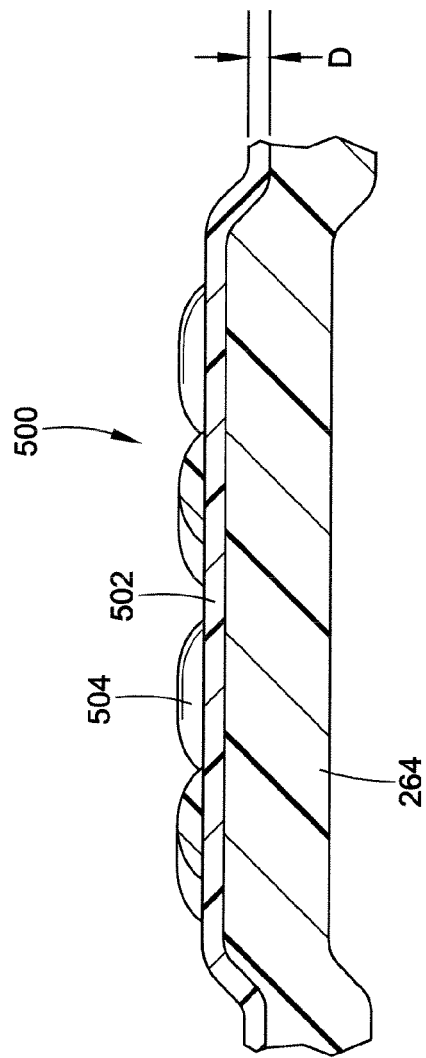
FIG. 17 is an enlarged partial view of FIG. 16.
Figure 22:
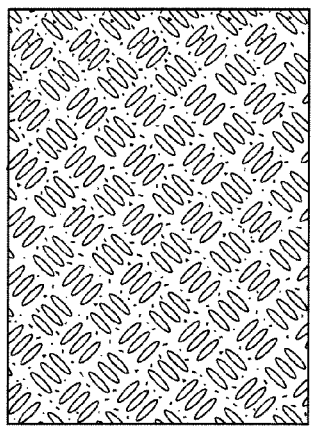
FIG. 22 illustrates yet another exemplary wear resistant surface for at least one ridge of the load-carrying bed of the pickup truck of FIG. 3.
Figure 18:
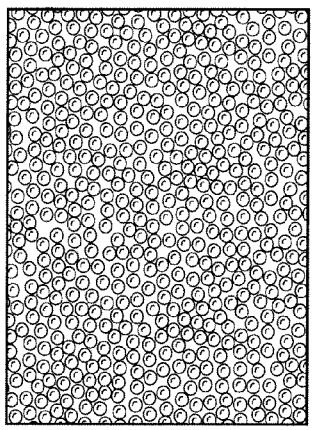
FIGS. 18-21 illustrate various configurations for the first texture of each of the wear resistant surfaces of FIGS. 14 and 15.
Figure 19:
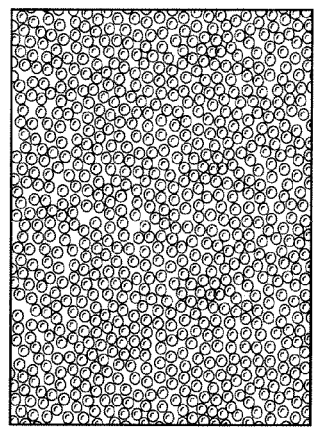
Figure 20:
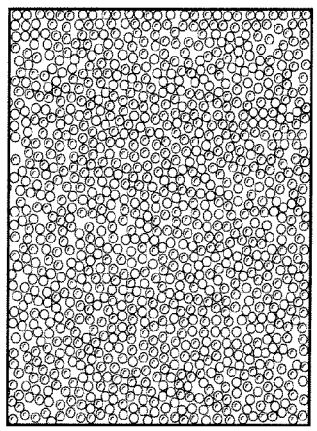
Figure 21:
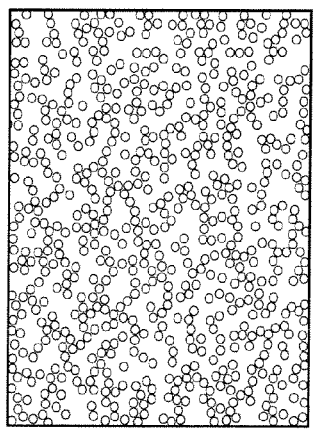

With reference to FIGS. 14 and 15, another exemplary wear resistant surface 500 for at least one ridge of the plurality of ridges 200, 250, 300 and 350 is illustrated. The wear resistant surface includes a first texture 502 disposed substantially over the entire ridge and a second texture 504 disposed over the upper part of the ridge and at least partially over the first texture. The first and second textures 502, 504 can be formed of the same material as the ridge for providing color uniformity to the bed floor 80; although, this is not required. It should be appreciated that the first and second textures 502, 504 can be formed of differing materials. With particular reference to exemplary ridge 250 shown in FIGS. 16 and 17, the first texture 502 can be disposed on the side walls 260, 262 and top wall 264 of the ridge 250 and the second texture 504 can be disposed on the top wall 264 of the ridge 250. The first texture 504 can also be disposed on the first support surface 86; although, this is not required. The first texture 502 is stipple shaped (i.e., random, non-technical generally round bumps) and can have a depth D of about 200 microns; although, this is not required. As shown in FIGS. 18-21, various stipple patterns for the first texture 502 are contemplated. The second texture 504 includes a plurality of spaced apart projections. As shown, the second texture 504 of the wear resistant surface 500 can includes one of a plurality of generally diamond shaped projections 510 (i.e., a diamond-plate feature) and a plurality of generally V-shaped projections 512, though other patterns are possible. For example, as shown in FIG. 22, the second texture can include a plurality of generally oval shaped projections, which are grouped together in an alternating pattern. Again, the wear resistant surface 500 can at least partially prevent wear and damage (such as scratches) to the ridge.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A cargo protecting system for a vehicle having a load-carrying bed, the system comprising:
   a support structure; and
   a bed floor fixedly supported by the support structure, the bed floor including a support surface and a plurality of longitudinal extending, spaced apart raised ridges located on the support surface for directly supporting cargo, each ridge having a pair of side walls and a top wall, the top wall of each ridge having a generally corrugated profile,
   wherein the support surface has a thickness, the side walls of each ridge have a thickness greater than the support surface thickness and the top wall has a thickness greater than the thickness of each side wall.

2. The system of claim 1, wherein at least one ridge of the plurality of ridges includes a wear resistant surface having a first texture and a second texture disposed at least partially over the first texture, the wear resistant surface providing color uniformity to the bed floor.

3. The system of claim 2, wherein the first texture is disposed on the side walls and top wall of the at least one ridge and the second texture is disposed on the top wall of the at least one ridge.

4. The system of claim 3, wherein the first texture is stipple shaped and has a depth of about 200 microns and the second texture includes a plurality of spaced apart projections.

5. The system of claim 1, wherein the top wall of the ridge includes a longitudinally extending depressed section.

6. The system of claim 1, wherein the top wall of the ridge includes a longitudinally extending raised section, the raised section of the top wall having a thickness equal to the thickness of the top wall.

7. The system of claim 1, wherein the top wall of the ridge includes at least two spaced apart, longitudinally extending ribs, each rib of the top wall having a thickness greater than the thickness of the top wall.

8. The system of claim 1, wherein the top wall of the ridge has a generally arcuate shape, the top wall having a central section and end sections, the central section of the top wall having a thickness greater than a thickness of each end section of the top wall.

9. A cargo protecting system for a vehicle having a load-carrying bed, the system comprising:
   a support structure forming at least a portion of a frame of the vehicle; and
   a bed floor fixedly supported by the support structure, the bed floor including a support surface and a plurality of longitudinal extending, spaced apart raised ridges located on the support surface for directly supporting cargo, each ridge having elevated and angled parts and an upper part, the upper part of each ridge having an increased thickness compared to the elevated and angled parts and a raised section for increased strength and rigidity of the ridge, an outer surface of each ridge including a wear resistant surface having a first texture disposed substantially over the outer surface of the entire ridge including the elevated and angled parts and the upper part and a second texture disposed solely over the upper part of the ridge, the second texture being different than the first texture and disposed at least partially over the first texture.

10. The system of claim 9, wherein the raised section is at least partially defined by a bottom surface of the upper part and has a thickness equal to the thickness of the upper part.

11. The system of claim 9, wherein the raised section has a thickness greater than the thickness of the upper part.

12. The system of claim 9, wherein the upper part has a generally corrugated profile.

13. The system of claim 9, wherein the first texture is stipple shaped and the second texture comprises a diamond-plate feature.

14. A load-carrying bed for attachment to a frame of a vehicle, the bed comprising:
- a bed floor fixedly supported by the vehicle frame, the bed floor including a support surface and a plurality of longitudinal extending, spaced apart ridges located on the support surface for directly supporting cargo, each ridge including a pair of side walls and a top wall, each ridge including a wear resistant surface having a first texture disposed substantially over the entire ridge and a second texture disposed over the top wall of the ridge,
- wherein the second texture is disposed at least partially over the first texture, the first texture being stipple shaped and the second texture comprising a plurality of spaced apart projections.

15. The system of claim 14, wherein the first texture has a depth of about 200 microns.

16. The system of claim 15, wherein each projection of the plurality of projections is one of generally diamond shaped and generally V-shaped.

17. The bed of claim 14, wherein each ridge has a generally corrugated profile, the top wall defining a first support surface and a second support surface spaced from the first support surface.

18. The bed of claim 14, wherein the ridge includes at least one raised, longitudinally extending rib.

19. The bed of claim 18, wherein a section of the ridge that includes the rib has a thickness equal to a thickness of a section of the ridge not having the rib, a bottom surface of the rib of the ridge being offset from and generally parallel to a bottom surface of the non-rib section of the ridge.

20. The bed of claim 18, wherein a section of the ridge that includes the rib has a thickness greater than a thickness of a section of the ridge not having the rib, a bottom surface of the rib section of the ridge and a bottom surface of the non-rib section of the ridge together defining a common bottom surface.

* * * * *